(12) United States Patent
Kim (10) Patent No.: US 9,446,699 B2
(45) Date of Patent: Sep. 20, 2016

(54) FOOTREST FOR CONSTRUCTION MACHINE OPERATING ROOM

(75) Inventor: Kang-Tae Kim, Chanwon-si (KR)

(73) Assignee: VOLVO CONSTRUCTION EQUIPMENT AB (SE)

(*) Notice: Subject to any disclaimer, the term of this patent is extended or adjusted under 35 U.S.C. 154(b) by 0 days.

(21) Appl. No.: 14/410,453

(22) PCT Filed: Jul. 12, 2012

(86) PCT No.: PCT/KR2012/005532
§ 371 (c)(1),
(2), (4) Date: Dec. 22, 2014

(87) PCT Pub. No.: WO2014/010766
PCT Pub. Date: Jan. 16, 2014

(65) Prior Publication Data
US 2015/0329034 A1 Nov. 19, 2015

(51) Int. Cl.
*B60N 3/06* (2006.01)
*E02F 9/16* (2006.01)
*E02F 9/08* (2006.01)

(52) U.S. Cl.
CPC ............... *B60N 3/06* (2013.01); *E02F 9/0858* (2013.01); *E02F 9/16* (2013.01); *E02F 9/166* (2013.01)

(58) Field of Classification Search
CPC ............ B60N 3/06; E02F 9/16; E02F 9/166; E02F 9/0858
USPC ............... 296/75, 193.06, 30, 1.02, 1.07
See application file for complete search history.

(56) References Cited

U.S. PATENT DOCUMENTS

| 2,380,118 | A | * | 7/1945 | Martz | ...................... | B60N 3/06 |
| | | | | | | 296/75 |
| 3,784,247 | A | * | 1/1974 | Mills | ....................... | B60N 3/06 |
| | | | | | | 296/75 |
| D288,187 | S | * | 2/1987 | Morris | ......................... | D12/114 |

(Continued)

FOREIGN PATENT DOCUMENTS

JP  05-078633 U  10/1993
JP  07-268907 A  10/1995

(Continued)

OTHER PUBLICATIONS

International Search Report (in Korean and English) and Written Opinion (in Korean) for PCT/KR2012/005532, mailed Feb. 1, 2013; ISA/KR.

*Primary Examiner* — Jason S Morrow
*Assistant Examiner* — E Turner Hicks
(74) *Attorney, Agent, or Firm* — Harness, Dickey & Pierce, P.L.C.

(57) ABSTRACT

Disclosed is a footrest for an operating room on which the operator can rest his foot in order to balance his body when he is operating in the operating room, or working on a slope, etc. The footrest for a construction machine operating room according to the present invention includes: a footrest support having one end pivotably attached to a front pillar member of the operating room by means of a hinge pin; a fixing grip arranged on the pillar member below the hinge pin so as to detachably fix the footrest support; and a fixing pin fastened to a bracket arranged at the pillar member to hold the footrest, the fixing pin being attached to the bracket so as to be moved forward and backward, so that the fixing pin may move forward to press the upper surface of the footrest support when pivoting the footrest support horizontally.

5 Claims, 5 Drawing Sheets

(56) References Cited

U.S. PATENT DOCUMENTS

6,152,474 A * 11/2000 Rupert .................... B62J 25/00
280/288.4
2013/0221703 A1  8/2013 Kim

FOREIGN PATENT DOCUMENTS

| | | |
|---|---|---|
| JP | 08-092998 A | 4/1996 |
| KR | 10-1997-0036987 A | 7/1997 |
| KR | 2009-0100929 A | 9/2009 |

* cited by examiner

Fig.1

Prior Art

Fig.2

Prior Art

FOOTREST FOR CONSTRUCTION MACHINE OPERATING ROOM

TECHNICAL FIELD

The present invention relates to a footrest for an operator's cab of a construction machine. More particularly, the present invention relates to a footrest for an operator's cab of construction machine, on which an operator can rest his or her feet in order to balance his or her body when he or she is operating in an operator's cab, or is working on a slope and the like.

BACKGROUND ART

In general, there frequently occurs the case where a construction machine such as an excavator performs a work on a slope or is moved to the slope. In addition, in the case where an operator transports the excavator to a remote place, the excavator is often loaded on a transport truck.

As such, when an operator performs a work on a slope using an excavator or loads the excavator on the transport truck, his or her body leans toward the front of the machine due to a steep slope of the operator's seat. In this case, a separate foothold is required to be located at a position higher than that of a foothold mounted on a bottom surface of the operator's cab so that the operator can balance his or her body.

Figure 1:
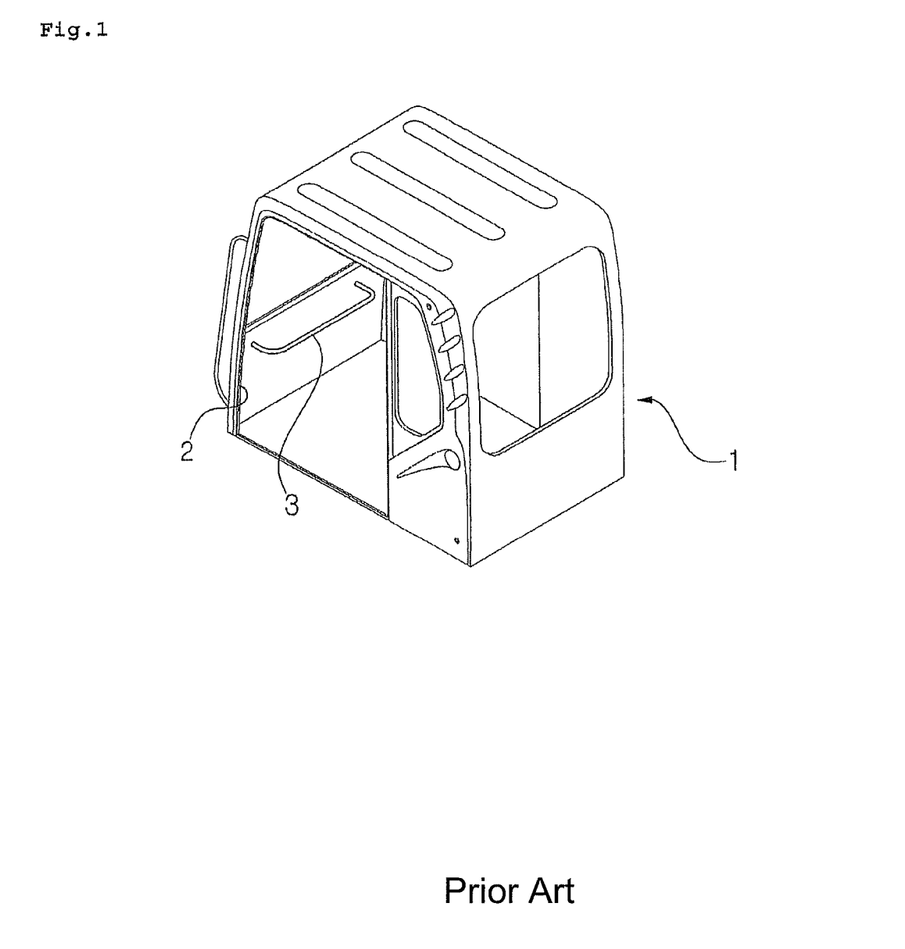
FIG. 1 is a schematic perspective view a use state of a footrest for an operator's cab of a construction machine in accordance with an example of the prior art.

As shown in FIG. 1, a footrest for an operator's cab of a construction machine in accordance with an example of the prior art includes a pair of front right and left pole members 2 mounted in the cab, and a foothold support 3 formed in a bar shape and integrally fixed at both ends thereof to the front right and left pole members 2 by welding so that the operator can put his or her feet on the foothold support 3 during the operation or transport of the construction machine.

The conventional footrest entails drawbacks in that the foothold support 3 is maintained in a state of being always securely fixed to an inner front part of the operator's cab, thereby degrading an external appearance of the footrest, in that even in the case where the foothold support 3 is not used, it is still maintained in a fixed state, leading to an interference of the operator's front field of vision during the operation of the construction machine, and in that the movement of the operator's feet is restricted at ordinary times, which gives an convenience to the operator.

Figure 2:
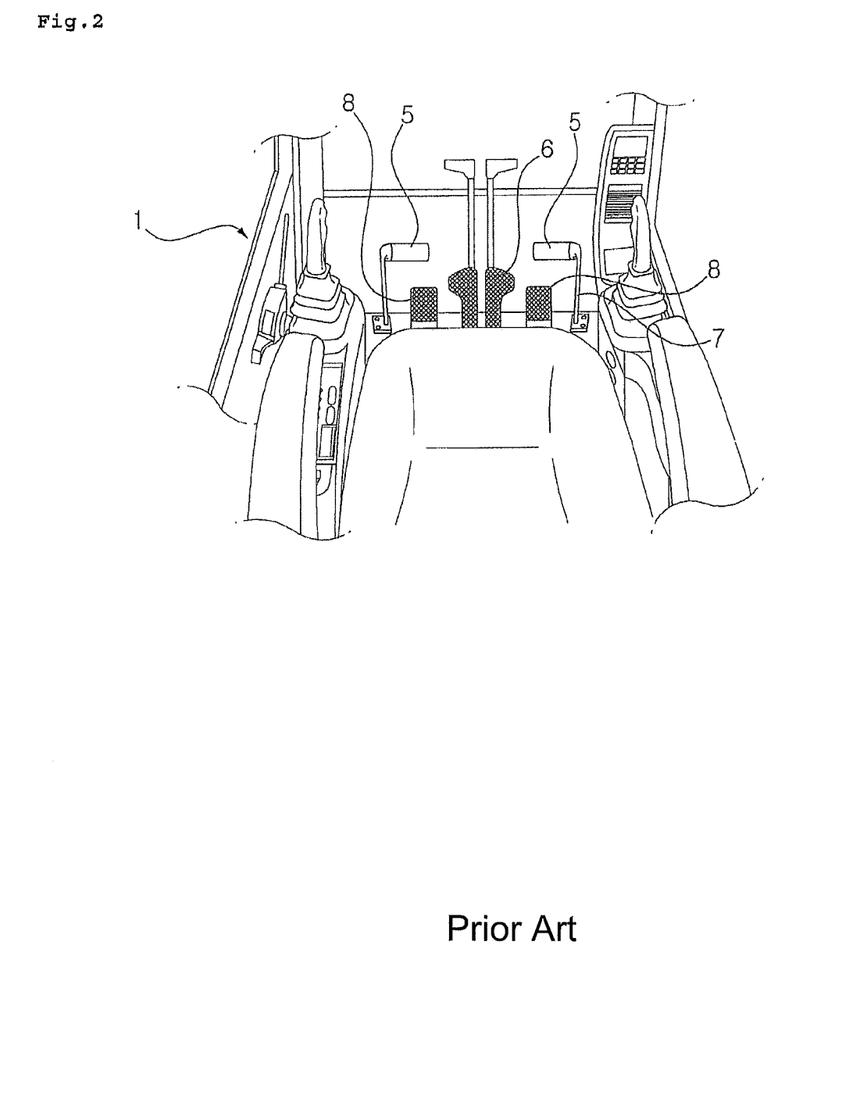
FIG. 2 is a schematic perspective view a use state of a footrest for an operator's cab of a construction machine in accordance with another example of the prior art.

As shown in FIG. 2, a footrest for an operator's cab of a construction machine in accordance with another example of the prior art includes a pair of opposed foothold supports 5 disposed at the left and right sides of a pair of travel pedals 6 so that the operator can put his or her feet on the foothold supports 5 during the operation or transport of the construction machine, and a pair of fixing members 7 formed in a bar shape, the fixing members being securely fixed at one ends thereof to a bottom surface of the operator's cab and mounted at the other ends thereof to the foothold supports 5.

By virtue of this configuration, since the foothold supports 5 are located at a position higher than that of a pair of footholds 8 mounted to the bottom surface of the operator's cab 1, the operator can selectively put his or her feet on the foothold supports 5 or the footholds 8 to balance his or her body depending on a gradient of the construction machine. On the other hand, the conventional footrest involves problems in that the foothold supports 5 are also always positioned in front of the operator's seat, thereby degrading an external appearance of the footrest, in that the operator's front field of vision is interfered with during the operation of the construction machine, and in that in the case where the foothold supports 5 are not used, the movement of the operator's feet is restricted, which gives an convenience to the operator.

DISCLOSURE

Technical Problem

Accordingly, the present invention has been made to solve the aforementioned problems occurring in the prior art, and it is an object of the present invention to provide a footrest for an operator's cab of a construction machine, in which an operator uses foothold supports only under the operation condition where he or she can put his or her feet on the foothold supports, and in the case where the foothold supports are unnecessary, the operator can fix the foothold supports to the pole members by a fixing pin in a state in which the foothold supports are positioned close to pole members of the cab.

Another object of the present invention is to provide a footrest for an operator's cab of a construction machine, in which an interference of the operator's front field of vision due to the foothold supports can be avoided, the operator can move his or her feet freely, and a cause of a defective external appearance is enhanced.

Technical Solution

To achieve the above objects, in accordance with an embodiment of the present invention, there is provided a footrest for an operator's cab of a construction machine, on which an operator in the cab can put his or her feet, the footrest including:
  a pair of opposed foothold supports, each of which is rotatably fixed at one end thereof to each of a pair of opposed front pole members of the cab by a hinge pin;
  a fixing grip mounted on each of the pole members under the hinge pin and configured to detachably fix each of the foothold supports; and
  a fixing pin coupled to any one of a pair of brackets, which is extendingly mounted on each of the front pole members to allow the foothold supports to be fixed to the brackets, in a forwardly and rearwardly movable manner and configured to advance forwardly to press the top surfaces of the foothold supports when each of the foothold supports is pivotally rotated to a horizontal position.

In accordance with a preferred embodiment of the present invention, the footrest may further include a knob formed at an outer end of the fixing pin. When the knob is forcibly pulled to an opposite side to a front windshield glass of the cab to pivotally rotate the foothold supports toward the pole members, respectively, the fixing pin is separated from the foothold supports, and the foothold supports are rotated about the hinge pin as a center axis by their own weights to cause the foothold supports to be pivotally rotated toward the pole members, respectively.

Each of the foothold supports may be fixed to any one of the front left and right pole members of the cab.

The foothold supports may be respectively fixed to the front left and right pole members of the cab in such a manner as to face each other.

The footrest may further include an elastic member configured to elastically bias the fixing pin, which is pressed by the elastic member, to its initial position to forwardly advance the fixing pin.

The footrest may further include a stopper formed protrudingly inwardly from a lower inner surface of any one of the brackets to which the foothold supports is rotatably fixed, and a locking piece formed to extend from one side surface of each of the foothold supports so as to prevent an excessive pivotal rotation thereof over a predetermined angle through the stopper when the foothold supports are pivotally rotated to the horizontal position, as means for preventing the excessive pivotal rotation of the foothold supports over the predetermined angle when the foothold supports are pivotally rotated to the horizontal position.

Advantageous Effect

The footrest for an operator's cab of a construction machine in accordance with the present invention as constructed above has the following advantages.

The operator can unfold the foothold supports to put his or her feet depending on the operation condition. In the case where the foothold supports need not to be used, the operator can fix the foothold supports to the pole members by the fixing grip in a state in which the foothold supports are positioned close to the pole members of the cab, thereby efficiently utilizing the foothold supports while avoiding the interference of an operator's front field of vision of the due to the foothold supports during the operation of the construction machine.

Moreover, the interference of the operator's front field of vision due to the foothold supports can be prevented, thereby ensuring workability and safety, and the operator can move his or her feet freely. In addition, a cause of a defective external appearance is enhanced, thereby providing reliability of the machine to the user.

BRIEF DESCRIPTION OF THE DRAWINGS

The above objects, other features and advantages of the present invention will become more apparent by describing the preferred embodiments thereof with reference to the accompanying drawings, in which.

EXPLANATION ON REFERENCE NUMERALS OF MAIN ELEMENTS IN THE DRAWINGS

10: operator's cab
11,12: pole members
13: hinge pin
14,15: foothold supports
16: fixing grip
17: bracket
18: front windshield glass
19: fixing pin
20: knob

PREFERRED EMBODIMENTS OF THE INVENTION

Now, preferred embodiments of the present invention will be described in detail with reference to the accompanying drawings. The matters defined in the description, such as the detailed construction and elements, are nothing but specific details provided to assist those of ordinary skill in the art in a comprehensive understanding of the invention, and the present invention is not limited to the embodiments disclosed hereinafter.

As shown in FIGS. 3 to 5(a) and 5(b), a footrest for an operator's cab 10 of a construction machine, on which an operator in the cab can put his or her feet, in accordance with an embodiment of the present invention includes:

a pair of opposed foothold supports 14 and 15, each of which is rotatably fixed at one end thereof to a pair of brackets 17 and 17a extendingly mounted on each of a pair of opposed front pole members 11 and 12 of the cab 10 by a hinge pin 13;

a fixing grip 16 mounted on each of the pole members 11 and 12 under the hinge pin 13 and configured to detachably fix each of the foothold supports 14 and 15; and a fixing pin 19 coupled to the brackets 17 in a forwardly and rearwardly movable manner and configured to advance forwardly (i.e., toward a front windshield glass of the cab 10) to press the top surfaces of the foothold supports 14 and 15 when each of the foothold supports 14 and 15 is pivotally rotated to a horizontal position.

In this case, the footrest further includes a knob 20 formed at an outer end of the fixing pin 19.

When the knob 20 is forcibly pulled to an opposite side to a front windshield glass of the cab 10 to pivotally rotate the foothold supports 14 and 15 toward the pole members 11 and 12, respectively, the fixing pin 19 is separated from the foothold supports 14 and 15, and the foothold supports 14 and 15 are rotated about the hinge pin 13 as a center axis by their own weights to cause the foothold supports 14 and 15 to be pivotally rotated toward the pole members 11 and 12, respectively.

The footrest may further include an elastic member 21 (e.g., compression coil spring) configured to elastically bias the fixing pin 19, which is pressed by the elastic member 21, to its initial position, to forwardly advance the fixing pin 19.

The footrest may further include a stopper 22 formed protrudingly inwardly from a lower inner surface of any one of the brackets 17 and 17a to which the foothold supports 14 and 15 is rotatably fixed, and a locking piece 23 formed to extend from one side surface of each of the foothold supports 14 and 15 so as to prevent an excessive pivotal rotation thereof over a predetermined angle through the stopper when the foothold supports 14 and 15 are pivotally rotated to the horizontal position, as means for preventing the excessive pivotal rotation of the foothold supports 14 and 15 over the predetermined angle when the foothold supports 14 and 15 are pivotally rotated to the horizontal position.

Although not shown in the drawings, each of the foothold supports 14 and 15 may be fixed to any one of the front right and left pole members 11 and 12 of the cab 10.

Hereinafter, a use example of a footrest for an operator's cab of a construction machine in accordance with an embodiment of the present invention will be described in detail with reference to the accompanying drawings.

Figure 3:
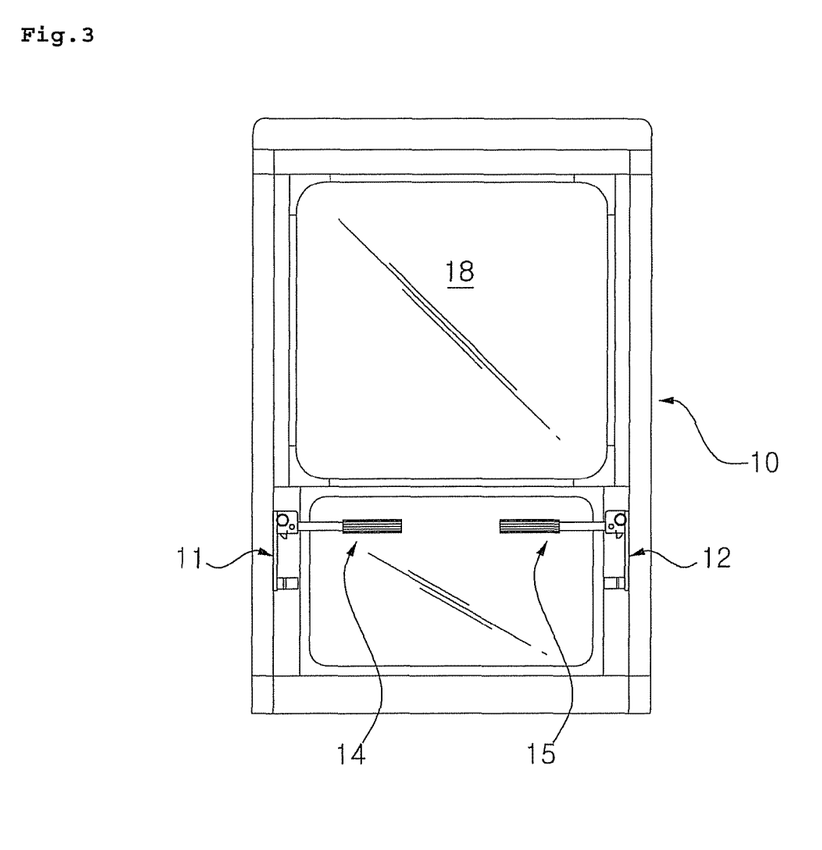
FIG. 3 is a view showing a state in which footrest for an operator's cab of a construction machine is mounted at the cab in accordance with an embodiment of the present invention.
Figure 4:
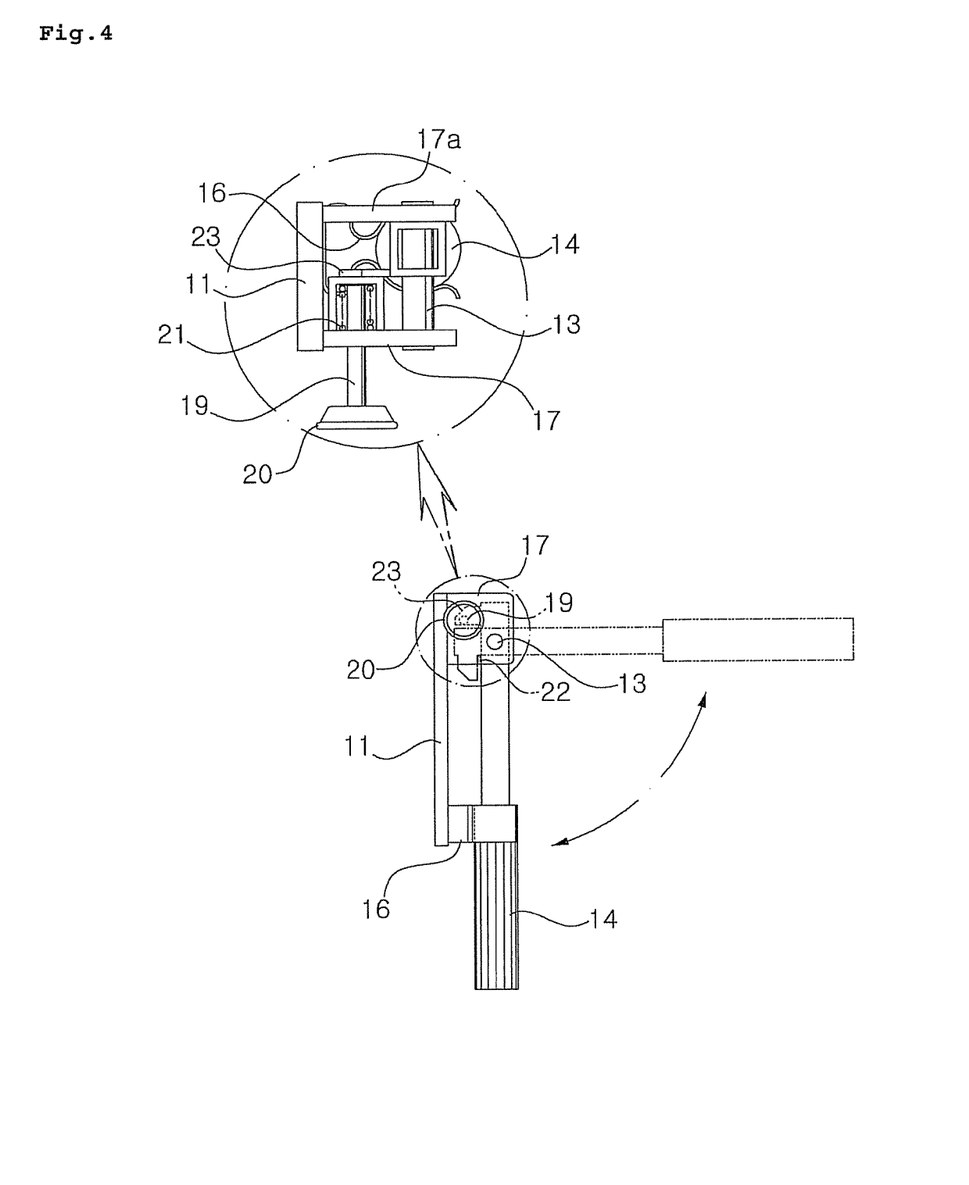
FIG. 4 is a schematic perspective view a use state of a footrest for an operator's cab of a construction machine in accordance with an embodiment of the present invention.
Figure 5A:
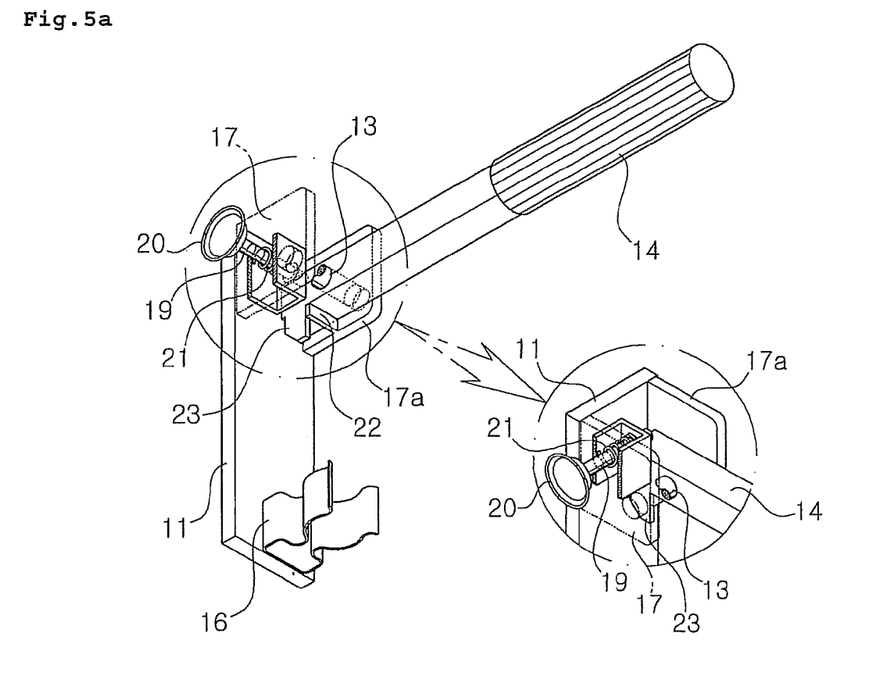
FIGS. 5(a) and 5(b) are perspective views showing a state in which a foothold support is folded and unfolded in a footrest for an operator's cab of a construction machine in accordance with an embodiment of the present invention.

As shown FIGS. 3 and 5(a), in the case where an operator is working on a slope and the like using an exactor, or an excavator loaded on a transport truck is transported, the operator inside an operator's cab requires a foothold having a predetermined height so as to balance his or her body due to a steep slope. In this case, the operator can put his or her feet on the foothold supports 14 and 15 mounted on the front right and left pole members 11 and 12 at a predetermined height.

In other words, a user separates the foothold supports 14 and 15 from the fixing grip 16 formed on the pole members 11 and 12, respectively, with him or her gripping the foothold supports 14 and 15, and then pivotally rotate the foothold supports 14 and 15 about the hinge pin 13 as a center axis at an angle of 90 degrees to a horizontal position. In this case, a distal end of the fixing pin 19 pressing the outer surface of the locking piece 23 of each of the foothold supports 14 and 15 slides along the outer surface of the foothold supports 14 and 15, so that the end of the fixing pin 19 is positioned on the top surfaces of the foothold supports 14 and 15. In other words, the foothold supports 14 and 15 can be pivotally rotated relative to the pole members 11 and 12 to a horizontal position through the rotation of the hinge pin 13 as a center axis by one-touch manipulation of a user.

As mentioned above, when the foothold supports 14 and 15 are pivotally rotated to a horizontal position, the stopper 23 formed on the lower inner surface of the bracket 17a and the locking piece 23 extendingly formed on each of the foothold supports 14 and 15 can prevent the excessive pivotal rotation of the foothold supports 14 and 15 beyond a horizontal position over the predetermined angle.

The fixing pin 19 coupled to the bracket 17 extendingly mounted on each of the pole members 11 and 12 is moved toward a front windshield glass 18 by means of an elastic force of the elastic member 21, and thus the distal end of the fixing pin 19 is positioned on the top surface of each of the foothold supports 14 and 15.

As mentioned above, after the foothold supports 14 and 15 is pivotally rotated about the hinge pin 13 as the center axis to a horizontal position from a vertical position, the operator can put his her feet on the foothold supports 14 and 15 supported by the hinge pin 19 to maintain a horizontal state of the foothold supports 14 and 15.

Figure 5B:
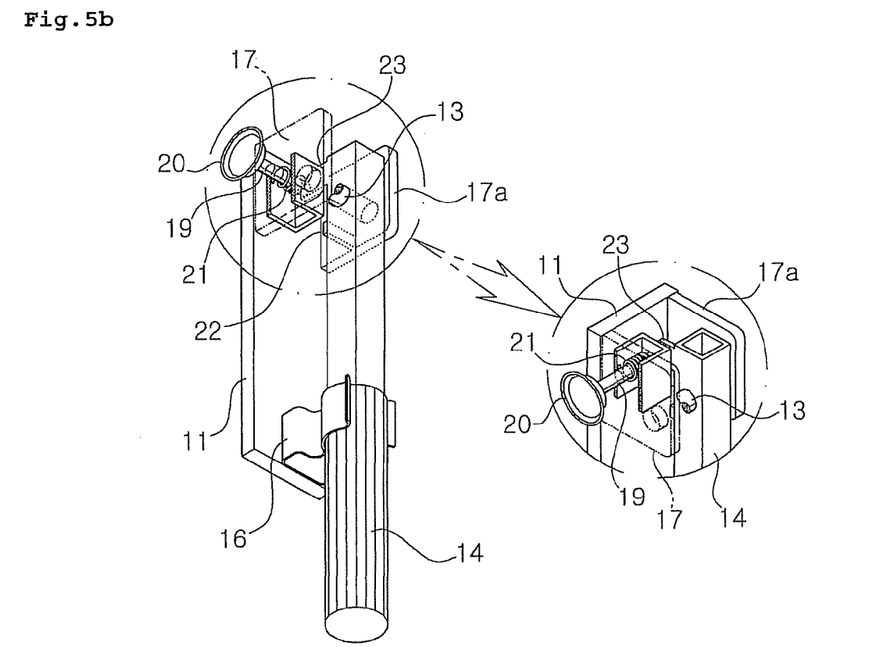

As shown in FIGS. 3 and 5(b), in the case where since the operator's work using an exactor on a slope and the like is completed, the foothold supports 14 and 15 needs not to be used, the operator pivotally rotates the foothold supports 14 and 15 to their initial positions, i.e., their vertical positions so that the foothold supports 14 and 15 can be fixedly brought into close contact with the pole members 11 and 12. In other words, when the operator forcibly pulls the knob 20 formed on the outer end of the fixing pin 19 toward an operator's seat with him or her gripping the knob 20, the distal end of the fixing pin 19 is separated from each of the foothold supports 14 and 15. At this time, the elastic member 21 receives a compressive force.

For this reason, each of the foothold supports 14 and 15 is pivotally rotated about the hinge pin 13 to a vertical position from a horizontal position by its own weight. In this case, when an external force required to pull the knob 20 is removed, the fixing pin 19 is pressed toward the front by means of the elastic force of the elastic member 21, and thus the distal end of the fixing pin 19 is abutted against the sidewall of each of the foothold supports 14 and 15. In the case where the operator insertingly engages each of the foothold supports 14 and 15 with the fixing grip 16 in a press-fit manner, the foothold supports 14 and 15 can be securely fixed to the pole members 11 and 12 so as to be maximally close to the pole members 11 and 12.

As mentioned above, under the operation condition where the operator performs a work on a slope and the like, he or she pivotally rotates the foothold supports 14 and 15 mounted on the front right and left pole members 11 and 12 to a horizontal position so as to put his or her feet on the foothold supports 14 and 15 so that the operator can balance his or her body while sitting on the operator's seat. On the contrary, under the operation condition where the foothold supports 14 and 15 need not to be used, when the operator pivotally rotates the foothold supports 14 and 15 to the vertical position from the horizontal position, the foothold supports 14 and 15 are positioned close to the pole members 11 and 12 and are fixed in position by the fixing grip 5 so that an interference of a front vision of the operator is avoided, thereby improving workability and safety. In addition, the operator can move his or her feet freely even in a narrow operator's cab space, and a cause of a defective external appearance due to the collapsible structure of the foothold supports 14 and 15 can be eliminated.

INDUSTRIAL APPLICABILITY

In accordance with the present invention as constructed above, the operator unfolds the foothold supports to put his or her feet depending on the operation condition. In the case where the foothold supports need not to be used, the operator can fix the foothold supports to the pole members by the fixing grip in a state in which the foothold supports are positioned close to the pole members of the cab, thereby avoiding the interference of a front vision of the operator due to the foothold supports during the operation of the construction machine.

Moreover, the interference of the operator's front field of vision due to the foothold supports is prevented, thereby ensuring workability and safety, the operator can move his or her feet freely, and a cause of a defective external appearance is enhanced.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present invention. Therefore, the true technical scope of the present invention should not be defined by the above-mentioned embodiments but should be defined by the appended claims and equivalents thereof.

What is claimed is:

1. A footrest for an operator's cab of a construction machine, on which an operator in the cab can put his or her feet, the footrest comprising:

a pair of opposed foothold supports, each of which is rotatably fixed at one end thereof to each of a pair of opposed front pole members of the cab by a hinge pin;

a fixing grip mounted on each of the pole members and under the hinge pin and configured to detachably fix each of the foothold supports;

a fixing pin coupled to any one of a pair of brackets, which is extendingly mounted on each of the front pole members to allow the foothold supports to be fixed to the brackets, in a forwardly and rearwardly movable manner and configured to advance forwardly to press the top surfaces of the foothold supports when each of the foothold supports is pivotally rotated to a horizontal position; and a stopper formed protrudingly inwardly from a lower inner surface of any one of the brackets to which the foothold supports is rotatably fixed, and a locking piece formed to extend from one side surface of each of the foothold supports so as to prevent an excessive pivotal rotation thereof over a predetermined angle through the stopper when the foothold supports are pivotally rotated to the horizontal position, as means for preventing the excessive pivotal rotation of the foothold supports over the predetermined angle when the foothold supports are pivotally rotated to the horizontal position.

2. The footrest according to claim 1, further comprising a knob formed at an outer end of the fixing pin, wherein when the knob is forcibly pulled to an opposite side to a front windshield glass of the cab to pivotally rotate the foothold supports toward the pole members, respectively, the fixing pin is separated from the foothold supports, and the foothold supports are rotated about the hinge pin as a center axis by their own weights to cause the foothold supports to be pivotally rotated toward the pole members, respectively.

3. The footrest according to claim 1, further comprising an elastic member configured to elastically bias the fixing pin, which is pressed by the elastic member, to its initial position to forwardly advance the fixing pin.

4. The footrest according to claim 1, wherein each of the foothold supports is fixed to any one of the front left and right pole members of the cab.

5. The footrest according to claim 1, wherein the foothold supports are respectively fixed to the front left and right pole members of the cab in such a manner as to face each other.

* * * * *